Aug. 19, 1969 R. A. RIGHTMIRE ET AL 3,462,312
ELECTRICAL ENERGY STORAGE DEVICE COMPRISING
FUSED SALT ELECTROLYTE, TANTALUM CONTAINING
ELECTRODE AND METHOD FOR STORING
ELECTRICAL ENERGY
Filed Jan. 3, 1966
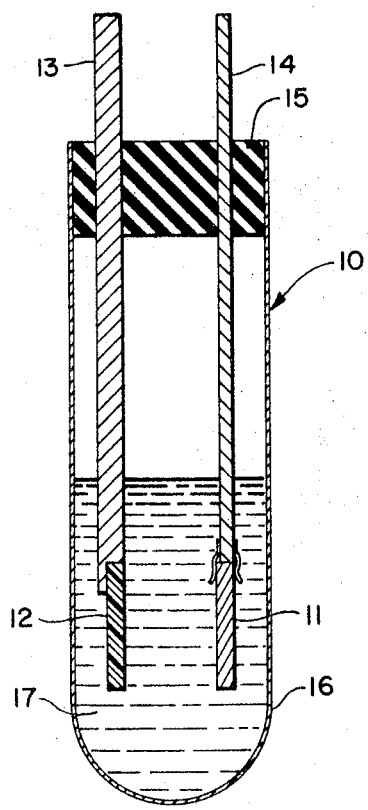
INVENTORS
ROBERT A. RIGHTMIRE
EDWARD S. BUZZELLI
BY
ATTORNEYS

United States Patent Office 3,462,312
Patented Aug. 19, 1969

3,462,312
ELECTRICAL ENERGY STORAGE DEVICE COMPRISING FUSED SALT ELECTROLYTE, TANTALUM CONTAINING ELECTRODE AND METHOD FOR STORING ELECTRICAL ENERGY
Robert A. Rightmire, Twinsburg, and Edward S. Buzzelli, Cleveland, Ohio, assignors to The Standard Oil Company, Cleveland, Ohio, a corporation of Ohio
Filed Jan. 3, 1966, Ser. No. 518,050
Int. Cl. H01m 27/20
U.S. Cl. 136—100                                         8 Claims

ABSTRACT OF THE DISCLOSURE

An electrical energy storage device operable above the melting point of the electrolyte. The storage device comprises a fused salt electrolyte and a pair of spaced electrodes immersed in the electrolyte, at least one of the electrodes comprising tantalum.

---

This invention relates to electrodes for an electrical energy storage device, and more particularly, to certain tantalum-containing electrodes to be used in an electrical energy storage device.

Electrical energy storage devices conventionally include an electrolyte in contact with a pair of electrodes, one of which is negatively charged, while the other electrode is positively charged, the electrodes being charged negatively or positively with respect to each other. The desirability of these electrical energy storage devices is based on the characteristic of high electrical energy storage per unit of total electrode volume.

Thus, it will be appreciated that the electrical energy storage capability of the electrodes is a very important factor in the total energy storage of which the device as a whole is capable.

It has now been discovered, in accordance with the present invention, that the capability for energy storage of an electrical energy storage device can be greatly enhanced by use of at least one tantalum-containing composite electrode, the tantalum-containing composite electrode can comprise solely tantalum and/or tantalum compounds in combination with other electrically conductive material. The term "tantalum-containing composite electrode" is therefore used to mean any electrode comprising tantalum or compounds thereof, such as tantalum chloride or tantalum oxide.

Electrically conductive material can comprise, for example, carbon, graphite, boron carbide, silicon carbide, tungsten carbide, petroleum coke and conductive carbides, silicides, nitrides and oxides of metals, stable in the environment of the halide-containing electrolyte. Also present as part of the composite electrode is any available binder, such as a carbonized phenolic resin or carbonized coal tar pitch.

Electrical energy storage devices comprising the tantalum-containing composite cathode (positive electrode) have exhibited electrical capacities in excess of 500 amp.-minutes per cubic inch of electrode. This is far greater than those capacities measured using a carbon electrode in place of the tantalum-containing composite electrode. If desired, both positive and negative electrodes can be tantalum containing.

It has been found that the tantalum-containing component of the electrode can vary although not necessarily with equivalent results, from about 5 weight percent, based on total composition weight, to in excess of about 98 weight percent, based on total composition weight, the balance being electrically conductive material, as aforementioned. However, tantalum concentrations of about 40–60 weight percent, based on total electrode composition, are favored in most electrode-electrolyte energy storage devices. The advantages of the tantalum electrode can be observed at compositions lower than 5 weight percent, but the advantages are not considered substantial.

It has been found that electrodes comprising tantalum in these amounts work as a reversible positive electrode with extremely high energy storage. The tantalum-containing composite positive electrode of the invention gives about 250–500 percent greater energy storage capacity than an equivalent amount of a corresponding carbon electrode of a surface area of about 400 meters per sq. gram, a transverse strength of 1600 p.s.i., a resistance of 0.013 ohm/in.$^3$, and a tensile strength of about 700 lb./in.$^2$.

The particles of material, e.g. the tantalum with or without other conductive material or binder, the tantalum-containing particles of which are from about 100–100,000 angstroms, comprising the composite electrode are mechanically blended together and mechanically pressed at a temperature of from about 50° C.–500° C., or above the flow temperature of the binder if used, and at a pressure of above about 1000 pounds per square inch. Higher pressures provide greater active electrode content per unit volume of electrode. The maximum pressure limit is determined by the desired porosity in the finished electrode.

After pressing, where binder is used, the electrodes are heated in an inert atmosphere at a temperature of from about 100° C.–1200° C. to cure and bake the binder. Inert gas (e.g. argon, helium or nitrogen) is used to control oxidation. After baking, in which considerable $CO_2$, steam and CO are evolved, and a composite mixture is formed, the electrodes are porous, strong and electrically conductive. Other methods of producing a tantalum-containing mass, i.e. a tantalum plate, are also contemplated.

Before an electrical energy storage device can be fabricated for market, the electrodes must be preconditioned, i.e. easily degradable components in the structure must be removed and the electrode must become permeated with electrolyte. Therefore, prior to commercial operation of the electrical storage energy device, the carbon containing electrode assemblies, including the tantalum-containing composite electrode, are alternately charged positively and negatively. The preconditioning of the electrodes involves immersing the electrodes in a metal and halide ion-containing electrolyte and the electrodes are alternately charged to oxidize the tantalum with halide ions and discharged to reduce the tantalum.

Electrodes may also be prepared by hot pressing (sintering). Sintering is used herein to designate the state of the metal in which its particles begin to diffuse without any appreciable change of form, or at least start to be sticky, so that small particles begin to stick together on edges or surfaces contacting one another, and after cooling remain so. In general, the temperatures of sintering is such that the particles begin to coalesce, forming a coherent body with vacancies or voids between the individual particles, the importance of which in the present invention is to be discussed hereinafter.

Any method of electrode fabrication which produces a porous material is satisfactory. The porosity (void between particles) of the tantalum-containing composite electrode should be from about 15 to 70 percent, in the fully discharged or reduced state, the voids between composite particles being large enough to permit the electrolyte to enter freely the voids of the electrode and fill up the voids.

The electrode opposed to the tantalum-containing composite electrode of the electrical energy storage device of this invention can be a porous carbon electrode conductor in the form of finely divided particulate material, e.g. a high surface area, activated carbon.

Active carbon is prepared in a two-step process comprising formation of a porous amorphous primary carbon at a relatively low temperature, followed by the removal of adsorbed hydrocarbons from the primary carbon. Step two involves the removal of adsorbed hydrocarbons by combined oxidation and distillation involving steam alone, or steam and air; the hydrocarbons of low boiling points are broken down into more volatile substances easily removed at low temperatures and under conditions less likely to result in the deposition of secondary carbon, which is inactive. During the removal by oxidation and distillation of the hydrocarbons, a loss in primary carbon by oxidation occurs; the conditions of activation must therefore be chosen so that the hydrocarbons are oxidized rapidly while the primary carbons slowly.

In one method of operation of the steam-activation process, the carbon is placed in an upright steel tube with top feed and bottom discharge. Superheated steam enters and streams downward through the carbon, carrying away the undesired hydrocarbons before they can be decomposed by the high temperature and deposit inactive carbon. In air treatment the temperature is about 350° C.–450° C. while in the steam oxidation process, the temperature is about 800° C.–1200° C. Other electrodes may also be used in place of the carbon, as for example, an electrode of nickel, zinc, aluminum, magnesium and lithium and combinations thereof. Of these, an aluminum-lithium alloy electrode is preferred.

The aluminum-lithium electrode can be produced by combining lithium with the aluminum by preparing a preformed alloy of aluminum and lithium, or, alternatively, electrochemically by charging a substantially pure aluminum electrode in an electrolyte, containing lithium ions to the extent of about one amp-hr. per gram of aluminum, whereby lithium is diffused into the aluminum electrode structure.

The aluminum-lithium alloy of the electrode comprises aluminum in amounts of from about 70–95 weight percent, based on total composition, and from about 5–30 weight percent, based on total composition, lithium. Impurities such as, for example, copper, magnesium, manganese, indium and iron may be present in quantities less than 10 weight percent, based on total composition. An aluminum-lithium electrode of this range of composition operates at substantially constant voltage and exhibits high storage capabilities.

The aluminum-lithium electrode, which functions best in a lithium halide electrolyte, is capable of storing lithium metal of the electrolyte without forming an extensive liquid. Hence, the electrode remains solid, which solid electrode is capable of diffusing the lithium metal of the electrolyte through its structure. It has been found that on charge of the cell comprising the aluminum-lithium electrode, the electrode structure expands wherein lithium metal of the electrolyte enters the electrode structure; on discharge, the lithium metal leaves the electrode structure. The electrode must, therefore, be able to withstand the stresses of expansion and contraction. For this reason, the aluminum-lithium metal electrode is preconditioned prior to use.

The electrode material is preconditioned by slow charge and discharge initially. This slow preconditioning results in an electrode of substantially high uniform aluminum-lithium distribution porosity and which electrode facilitates the takeup and release of the lithium metal upon the subsequent fast charge and discharge of a cell containing the electrode. If the initial charge and discharge cycles of the preconditioning are carried out too rapidly, local regions of liquid metal alloy are built-up, and the result is pitting of the aluminum-lithium electrode, which pitting has a deleterious effect when the electrodes are put into routine use. Evidence of such pitting is visually evident in the aluminum-lithium electrodes as lithium aggolmeration. Aluminum-lithium electrodes cycled by slow charge and discharge show a fine, even distribution of the lithium metal in the aluminum.

The electrolyte used in the device of this invention is a medium comprising a source of dissociated metal and halide ions which are mobile and free to move in the medium. Fused salt mixtures containing, for example, sodium chloride, calcium chloride, calcium fluoride, magnesium chloride, lithium chloride, potassium chloride, and lithium bromide, potassium bromide can be used. These salts are particularly desirable from the standpoint of their low original cost. However, other economic factors, such as the operating temperature (size and cost of insulation packing for a reasonable heating cost), corrosiveness of the electrolyte or electro-decomposition products on the cell components and purification of the electrolyte must be considered. The lower melting point electrolytes are desirable. However, it is contemplated by the present invention that the electrolyte be operable at temperatures up to about 600° C.

Typical examples of materials which can be used as electrolytes include salts of metals. Specific examples of useful binary salt electrolytes are lithium chloride-potassium chloride, potassium chloride-magnesium chloride, magnesium chloride-sodium chloride, lithium bromide-potassium bromide, lithium fluoride-rubidium fluoride, magnesium chloride-rubidium chloride, lithium chloride-lithium fluoride, lithium chloride-strontium chloride, cesium chloride-sodium chloride, calcium chloride-lithium chloride, lithium sulfate-potassium chloride and mixtures thereof:

Examples of ternary salt electrolytes are calcium chloride-lithium chloride-potassium chloride, lithium chloride-potassium chloride-sodium chloride, calcium chloride-lithium chloride-sodium chloride, and lithium bromide-sodium bromide-lithium chloride.

Especially preferred systems, used with the aluminum-lithium electrode are those of potassium chloride-lithium chloride and lithium bromide and potassium bromide, and mixtures thereof.

A lithium chloride-potassium chloride system of 41 mole percent potassium chloride and 59 mole percent lithium chloride forms a eutectic which melts at 352° C. The potassium chloride-lithium chloride eutectic has a decomposition voltage of about 3.55 volts.

Referring more particularly to the drawing, a schematic test cell 10 of the present invention is shown. Tantalum-containing composite electrode 12 and opposed aluminum-lithium electrode 11 are positioned one from another, in spaced relationship, immersed in an electrolyte 17 held in a heat resistant glass tube 16. Tantalum-containing composite electrode 12 is fixed rigidly to a graphite current carrier 13 and aluminum-lithium electrode 11 is fixed rigidly to a steel current carrier 14. The container holding the electrolyte and electrodes is purged of atmospheric air and an inert gas introduced into the container. The open end of the container is then sealed with a cap 15 of inert material, such as lava or ceramic.

In operation, potassium chloride crystals and lithium chloride crystals were mixed in a proportion of 59 mole percent lithium chloride and 41 mole percent potassium chloride and dried at about 500° C. for two hours and introduced to an electric storage cell container as illustrated in the drawing, containing a tantalum-containing composite cathode and an opposed negative, aluminum-lithium alloy electrode of 18 weight percent lithium to a level about ½ inch above the electrodes. The two electrodes were connected through an external circuit. The electric storage cell was placed in an electric furnace at 500° C.

The cell was preconditioned in the furnace by charging the cell to 3.30 volts, open circuit, and discharging to about 0.7 volt, open circuit, and back to 3.30 volts open circuit. Additional cycling in this manner may be necessary, until constant discharge is obtained. Chemical preconditioning methods external to the cell may also be used.

It has been found that an energy storage cell so prepared has demonstrated energy storage at least about 3 times as great as presently known energy storage cells.

The device of the present invention operates more efficiently in a pressure range of about 1 p.s.i.g. to 1000 p.s.i.g. under an atmosphere of inert gas (e.g. He, A, Kr) and at a temperature of from about 350° C. to about 500° C. It has been found that pressure has an effect on the oxidation conditions of the tantalum and that pressure retards the degradation of the tantalum-containing composite electrode.

Since the electric energy storage device operates at or above the fusion temperature of the electrolyte, the above-mentioned electrolytes are provided a means of heating to insure their remaining in the molten state.

The electric energy storage units herein described lends themselves to connection with units of similar construction either by conection of a number of units in series and parallel or by utilization of a stack of electrodes.

The embodiments of the invention in which an exclusive property or privilege is claimed are defined as follows.

What is claimed is:

1. An electrical energy storage device operable above the melting point of the electrolyte under an atmosphere of inert gas, comprising in combination:
    (a) a molten salt electrolyte consisting essentially of alkali metal halide salts, alkaline earth metal halide salts, or mixtures thereof;
    (b) means for heating the electrolyte to at, or above its melting temperature; and
    (c) a pair of spaced electrodes contacting said electrolyte, at least one of the electrodes being porous and consisting essentially of tantalum, a tantalum compound, or mixtures thereof.

2. An electrical energy storage device in accordance with claim 1 wherein said tantalum electrode comprises other conductive media.

3. An electrical energy storage device in accordance with claim 1 wherein the tantalum-containing composite electrode comprises from about 5.0 to in excess of 98 percent tantalum.

4. An electrical energy storage device in accordance with claim 1 wherein the tantalum-containing composite electrode comprises from about 5.0 to in excess of 98 percent tantalum and is the positive electrode, the opposed electrode consists essentially of an aluminum-lithium alloy composition and the electrolyte comprising lithium halide.

5. An electrical energy storage device in accordance with claim 1 wherein the tantalum-containing composite electrode consists essentially of from about 5.0 to in excess of 98 percent tantalum and is the positive electrode, the opposed electrode consists essentially of carbon.

6. The electrical energy storage device of claim 1, which includes means for maintaining the electrolyte in an inert atmosphere under a predetermined pressure in the range of from about 1 p.s.i.g. to about 1000 p.s.i.g.

7. A method for storing electrical energy, comprising the steps of:
    (a) providing a molten salt electrolyte consisting essentially of alkali metal halide salts, alkaline earth metal halide salts, or mixtures of said salts;
    (b) heating the electrolyte, solid at ordinary temperatures, to above its melting point in an atmosphere of inert gas;
    (c) immersing a pair of electrodes in the electrolyte to form an electrical energy storage cell, at least one of the electrodes comprising tantalum, a tantalum compound, or mixtures thereof;
    (d) charging the cell electrically;
    (e) connecting the electrode externally through a circuit to produce useful work.

8. The method of claim 7, which includes placing the electrolyte under an inert gas pressure ranging from about 1 p.s.i.g. to about 1000 p.s.i.g.

References Cited

UNITED STATES PATENTS

| | | | |
|---|---|---|---|
| 2,908,849 | 10/1959 | Taylor | 136—120 |
| 2,937,219 | 5/1960 | Minmick et al. | 136—6 |
| 3,043,896 | 7/1962 | Herbert et al. | 136—6 |
| 3,055,960 | 9/1962 | Yalom et al. | 136—83 |
| 3,093,514 | 6/1963 | McCallum et al. | 136—100 |
| 3,120,695 | 2/1964 | Burnham | 204—42 |
| 3,160,531 | 12/1964 | Spindler | 136—120 |
| 3,236,694 | 2/1966 | Stenger et al. | 136—83 |
| 3,323,914 | 6/1967 | Fincham et al. | 75—174 |
| 3,343,948 | 9/1967 | Raclot | 75—138 |

WINSTON A. DOUGLAS, Primary Examiner

A. SKAPARS, Assistant Examiner

U.S. Cl. X.R.

136—83, 90, 120, 153